(No Model.) 2 Sheets—Sheet 2.
J. W. GRANTLAND.
ELECTRIC RAILWAY.
No. 475,107. Patented May 17, 1892.
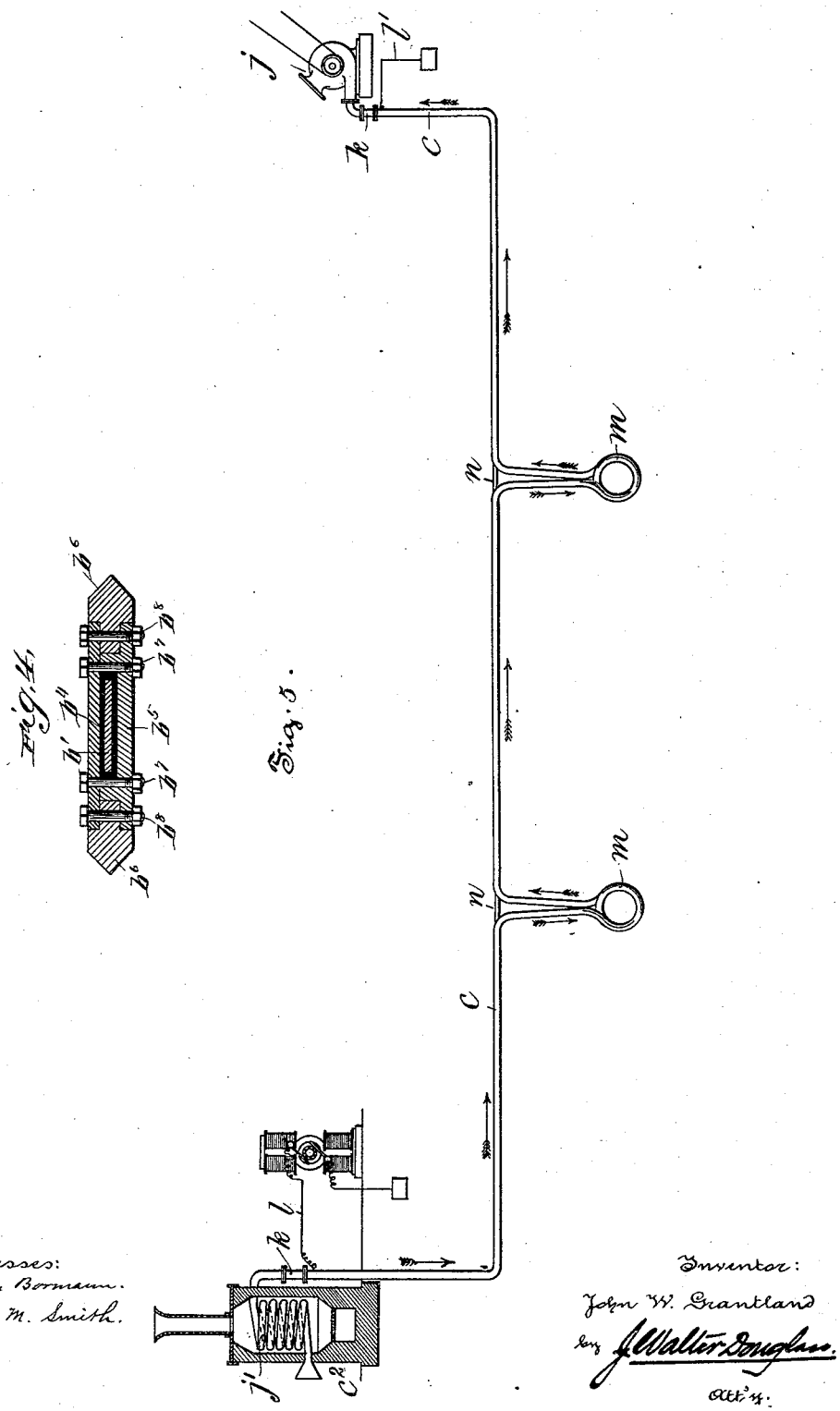

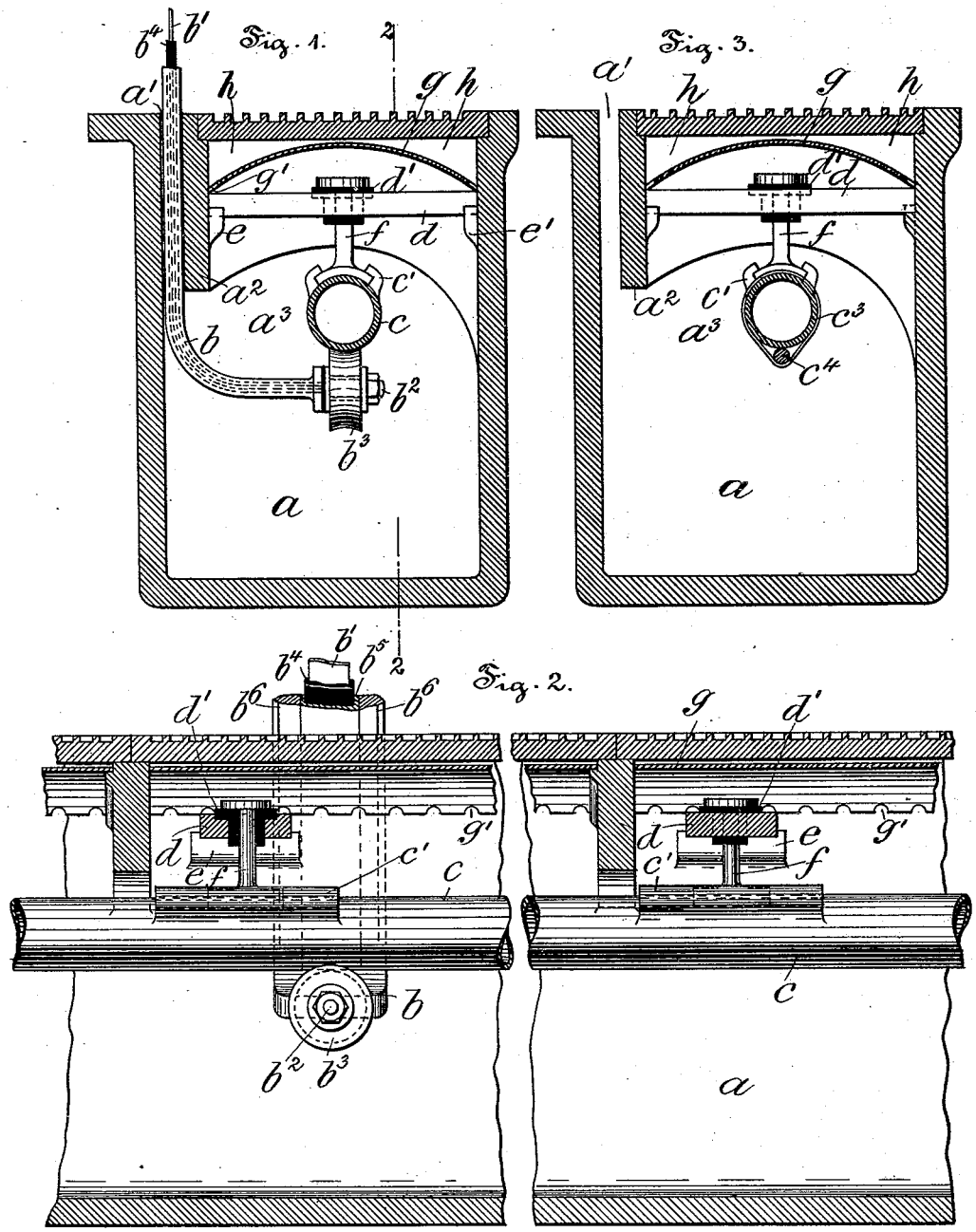

UNITED STATES PATENT OFFICE.

JOHN W. GRANTLAND, OF PHILADELPHIA, PENNSYLVANIA, ASSIGNOR TO GILBERT L. PARKER, OF SAME PLACE.

ELECTRIC RAILWAY.

SPECIFICATION forming part of Letters Patent No. 475,107, dated May 17, 1892.

Application filed January 14, 1892. Serial No. 418,013. (No model.)

*To all whom it may concern:*

Be it known that I, JOHN W. GRANTLAND, a citizen of the United States, residing at the city of Philadelphia, in the county of Philadelphia and State of Pennsylvania, have invented certain new and useful Improvements in Electric Railways, of which the following is a specification.

The principal objects of my invention are, first, to insure the presence of a continuous and uniform current throughout the entire length of an underground conduit for operating the motor of an electric-railway car, and, second, to maintain the main conductor for conveying the current through an underground conduit or subway substantially dry and free from moisture, whereby undue leakage of the current from the conductor is obviated.

My invention consists of the improvements hereinafter described and claimed.

According to my invention leakage from a main electrical conductor located in an underground conduit may be obviated in the following manner: The walls of an electrical conductor located in and insulated from an underground conduit or subway are included in circuit and impart the required current to the motors of the cars or other vehicles by means of trolleys, brushes, or sleds connected with the cars and traveling in contact with the electrified surface of the conductor, and a heated medium—as a stream or blast of hot air—is forced through the hollow interior of the conductor. This heated medium not only warms and drys the exterior surface of the conductor itself, but also imparts by radiation a portion of its heat to the air or other gaseous matter contained in ducts or passages extending throughout the length of the conduit and located at that portion of it, usually the top, where the presence of moisture is most deleterious, so that the surface of the main conductor is not only dried by the direct application of heat to the interior wall thereof, but is also protected from moisture by using a portion of the heat of radiation for preventing the deposition or collection of moisture at the top of the conduit from which it would tend to fall in drops upon the conductor.

The nature and characteristic features of my invention will be more fully understood from the following description, taken in connection with the accompanying drawings, forming part hereof, and in which—

Figure 1 is a transverse section of an underground conduit or subway, embodying features of my invention and especially adapted for use in carrying my mode of transmitting currents in connection with electric railways into effect. Fig. 2 is a longitudinal section taken on the line 2 2 of Fig. 1. Fig. 3 is a transverse section of an underground conduit or electrical subway, embodying a modification of my invention. Fig. 4 is a transverse section of the trolley-arm, showing the bolts for securing the parts thereof to place; and Fig. 5 is a diagrammatical view representing in elevation an apparatus for maintaining a circulation of heated air through a main conductor appertaining to an electric railway and conduit-coils connected with the tubular conductor for reheating the circulating air of the conductor.

In the drawings, $a$ is a conduit or subway adapted for use in connection with an electric railway and provided with a slot $a'$ for the reception of a trolley-arm $b$ and with an overhanging portion $a^2$ for affording a space $a^3$ at or near the top of the conduit for the reception of a main conductor $c$ of good conducting material, as copper. This main conductor $c$ is hollow or tubular and may be of any preferred form in cross-section.

$d$ are bridge-pieces disposed at convenient distances apart and ranging transversely of the space $a^3$. Each of these bridge-pieces $d$ is supported upon lugs $e$ and $e'$, projecting, respectively, from the side wall of the conduit and the overhanging portion $a^2$, and is provided with an insulating-gasket $d'$.

$f$ are hangers depending from the bridge-pieces $d$ and embedded in the insulating-gaskets $d'$. The lower extremity of each of the hangers $f$ is T-shaped, and these T-shaped extremities engage suitable cleats $c'$, projecting from the exterior of the hollow conductor $c$, as shown in Figs. 1, 2, and 3, so that the conductor $c$ is afforded a slight range of end p'ay in the hangers $f$, in order to compensate for expansion or contraction due to changes of temperature.

$g$ is a shield interposed between the top of the space $a^3$ and the bridge-pieces $d$, so that one or more ducts $h$ are formed.

$g'$ are apertures formed in the shield $g$, adjacent to the side walls of the space $a^3$, in order to permit drops of moisture to escape from the ducts $h$ and collect in the lower portion of the conduit, from which they may be drained off by suitable offtake-pipes. (Not shown.)

In practice a heated medium is caused to traverse the interior of the main conductor $c$, and thus the exterior of the conductor becomes sufficiently heated to dissipate all moisture that may tend to collect thereon. Moreover, heat is radiated from the conductor $c$ and is imparted to the air or gaseous vapor contained in the ducts $h$, and this heated air or vapor tends to keep the upper portion of the space $a^3$ free from moisture which otherwise would tend to collect by reason of the condensation that occurs upon the under side of the top plate of the conduit. Consequently the surface of the conductor $c$ is accessible to a trolley, sled, or contact-brush, and is kept dry with the result that the leakage of the current therefrom is reduced to a minimum.

$b$ is a trolley-arm especially adapted for use in connection with the above-described conduit. This trolley-arm comprises a copper conductor $b'$, provided at one extremity with a suitable journal $b^2$ for the trolley-wheel $b^3$ and at the other extremity thereof with electrical devices connected with a motor carried by a car or other vehicle. (Not shown.) The conductor $b'$ is enveloped in insulating material $b^4$, and is inclosed in a two-part steel casing $b^5$ whereof the respective members are bolted together by means of bolts $b^7$, Fig. 4. $b^6$ are solid steel bars or guards connected with the respective end walls of the casing $b^5$ by means of bolts $b^8$ and adapted to protect the same from undue wear and accidental injury.

Various mediums may be employed for conveying heat to the interior of the hollow conductor $c$. However, in the present instance, air is the medium employed for this purpose. Moreover various forms of apparatus may be employed for producing and forcing currents or blasts of hot air through the conductor $c$.

In Fig. 4 of the accompanying drawings, $j$ is a rotary exhaust-fan adapted to draw air from one extremity of the conductor $c$. $c^2$ is a furnace adapted to heat a coil of pipe $j'$, communicating with the atmosphere and with the other extremity of the conductor $c$, so that the fan $j$ draws air through the heated coil of pipe $j'$, wherein it becomes heated and then causes the heated air to traverse the interior of the conductor $c$, as is shown by the arrows in Fig. 4. $k$ are insulating-gaskets or sections of insulating-tubing interposed between the conductor $c$ and the fan $j$ and coil of pipe $j'$. $l$ is a conductor leading to the hollow conductor $c$ from one pole of a generator of which the other pole is connected to earth. $l'$ is a conductor connecting the hollow conductor $c$ to earth at the end of the line, so that the current traverses the main portion of the conductor $c$ without interfering with the operation of the fan or furnace. In long lines the heating medium is apt to become cool. However, this rather objectionable feature can be readily obviated by causing the hollow conductor $c$ to branch off laterally from the conduit $a$ and to interpose externally-heated coils $m$ in these branches in order to reheat the heating medium. No useful purpose is attained by permitting the current to traverse these coils $m$, so that auxiliary conductors $n$ are provided for enabling the current to bridge across the branches in the conductor $c$.

The construction and mode of operation of the apparatus shown in Fig. 3 are as above described with reference to Figs. 1, 2, and 4, with the following exceptions: that the hollow conductor $c$ is made in two parts firmly united together instead of being made in one part—that is to say, the main tubular body $c^3$ of the conductor $c$ is composed of one material, as iron, and the conducting portion $c^4$ thereof comprises a bead or wire of conducting material applied directly to or located in proximity with the tubular portion $c^3$—the object of this construction being to reduce the cost of the conductor.

Having thus described the nature and objects of my invention, what I claim as new, and desire to secure by Letters Patent, is—

1. In an electric railway, an overhanging slotted underground conduit, a vehicle provided with an arm carrying a trolley or sled, a hollow electrified conductor having a stream or blast of an absorbing or drying medium conveyed through said conductor, and relay-stations connected with said conductor for reheating the medium conveyed through said conductor, substantially as and for the purposes set forth.

2. In an electric railway, the combination of an overhanging slotted conduit, a hollow conductor supported beneath the overhanging portion of said conduit, a heating or drying medium introduced at suitable distances apart into and conducted through said conductor, means for electrifying the exterior surface of the conductor, and a vehicle provided with a depending curved arm having a trolley or sled attached thereto and contacting with the electrified surface of said conductor, substantially as and for the purposes described.

3. In an electric railway, the combination of an underground slotted conduit provided with an overhanging part, a tubular hollow conductor supported beneath the overhanging portion of said conduit, means arranged at suitable distances apart for permitting of the introduction and passage of a blast or stream of a drying medium into and through said conductor for drying the electrified exterior surface of said conductor and by radiation preventing the deposition or collection of moisture around or about the internal surface of the overhanging portion of the conduit, and a moving vehicle provided with a depending arm extending through the slotted portion of the conduit and carrying a trolley or sled contacting with the electrified surface of the conductor, substantially as and for the purposes described.

4. In an electric railway, a subway or conduit, a hollow conductor, means for forcing a heating medium through said conductor, and relay heating-stations connected with said conductor, substantially as and for the purposes described.

5. In an electric railway, an overhanging subway or conduit, flues or passages in the overhanging portion thereof, a hollow conductor located adjacent to said flues or passages and having its external walls included in circuit and accessible to a trolley or sled, and means for forcing heated blasts or streams through said conductor to heat the same and produce a circulation of gaseous vapor in said flues or passages, substantially as and for the purposes described.

6. In an electric railway, a hollow conductor, means for forcing a drying medium through said hollow electrified conductor, relay-stations interposed in branch circuits from said conductor for revivifying said drying medium, and shunt-conductors for short-circuiting or cutting out said relay-stations, substantially as and for the purposes described.

7. In an electric railway, an overhanging conduit or subway, bridge-pieces ranging transversely of the space formed by the overhanging portion of the conduit or subway, a shield supported on said bridge-pieces and forming ducts or passages, carriers depending from said bridge-pieces and insulated therefrom, a hollow conductor supported by said carriers, and means for forcing a heating medium through said hollow conductor, substantially as and for the purposes described.

8. In an electric railway, an overhanging conduit, bridge-pieces ranging transversely of the space formed by the overhanging portion of the conduit or subway, T-arms depending from said bridge-pieces and insulated therefrom, a hollow conductor provided with cleats engaging the heads of said T-arms and adapted to compensate for expansion and contraction of the conductor, and means for forcing a heating medium through said conductor, substantially as and for the purposes described.

9. In an electric railway, an overhanging conduit, a hollow electrified conductor located within the space formed by the overhanging portion of the conduit, a shield disposed above the conductor and provided with deep apertures at the edges thereof, means located at suitable distances apart for causing a heating and drying medium to be conveyed through said conductor, and a vehicle provided with a depending curved arm carrying a trolley or sled engaging the electrified surface of said conductor, substantially as and for the purposes described.

10. In an electric railway, an overhanging and slotted conduit supporting a tubular conductor having a heating and drying medium conveyed through the same and having the exterior surface electrified, a vehicle provided with an arm consisting of a copper conductor embedded in insulating material, a two-part surrounding casing, solid bars applied to the exterior wall of said casing, and a trolley or sled attached to said arm and contacting with the electrified surface of said hollow conductor, substantially as and for the purposes described.

11. In an electric railway, an overhanging and slotted conduit, a conductor supported beneath the overhanging portion of said conduit having a drying medium passed through the same, relay-stations connected with said conductor at determinate points, a trolley-arm provided with a flat or sheet copper conductor embedded in insulating material, a casing inclosing the copper conductor and its complemental insulating material, and bars suitably connected with said casing, substantially as and for the purposes described.

12. An electric railway comprising a subway or conduit, a hollow conductor suitably supported therein, means for forcing a heating medium through said conductor, relay heating-stations connected with said conductor, and a vehicle provided with an arm carrying a trolley or sled and contacting with the electrified exterior surface of said conductor, substantially as and for the purposes described.

In witness whereof I have hereunto set my signature in the presence of two subscribing witnesses.

JOHN W. GRANTLAND.

Witnesses:
RICHARD C. MAXWELL,
THOMAS M. SMITH.